US012689071B2

(12) United States Patent
Wang et al.

(10) Patent No.: US 12,689,071 B2
(45) Date of Patent: Jul. 21, 2026

(54) BATTERY ENERGY PROCESSING DEVICE AND METHOD, AND VEHICLE

(71) Applicant: BYD COMPANY LIMITED, Shenzhen (CN)

(72) Inventors: Junlong Wang, Shenzhen (CN); Liming Lao, Shenzhen (CN); Liang Wang, Shenzhen (CN); Penghui Xue, Shenzhen (CN); Mingwen Chen, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 880 days.

(21) Appl. No.: 17/928,560

(22) PCT Filed: Nov. 19, 2020

(86) PCT No.: PCT/CN2020/130178
§ 371 (c)(1),
(2) Date: Nov. 29, 2022

(87) PCT Pub. No.: WO2021/238103
PCT Pub. Date: Dec. 2, 2021

(65) Prior Publication Data
US 2023/0238591 A1 Jul. 27, 2023

(30) Foreign Application Priority Data
May 29, 2020 (CN) .......................... 202010476447.1

(51) Int. Cl.
*H01M 10/44* (2006.01)
*H01M 10/615* (2014.01)
(Continued)

(52) U.S. Cl.
CPC ......... *H01M 10/44* (2013.01); *H01M 10/615* (2015.04); *H01M 10/625* (2015.04);
(Continued)

(58) Field of Classification Search
CPC ..... B60L 58/27; H01M 10/44; H01M 10/486; H01M 10/615; H01M 10/625;
(Continued)

(56) References Cited

U.S. PATENT DOCUMENTS

2014/0239903 A1* 8/2014 Choi ................... H01M 10/637
320/128
2014/0286071 A1 9/2014 Choi
(Continued)

FOREIGN PATENT DOCUMENTS

CN 104064836 A 9/2014
CN 105680114 A 6/2016
(Continued)

OTHER PUBLICATIONS

English Translation of International Search Report from PCT/CN2020/130178 dated Feb. 5, 2021 (2 pages).

*Primary Examiner* — Julian D Huffman
*Assistant Examiner* — Ryu-Sung P. Weinmann
(74) *Attorney, Agent, or Firm* — Calfee, Halter & Griswold LLP

(57) ABSTRACT

A battery energy processing device includes: first and second inductors, first and second phase bridge arms, an energy storage element, and a controller. First ends of the first and second inductors are connected with a positive electrode of a battery. A midpoint of the first phase bridge arm is connected with a second end of the first inductor; A midpoint of the second phase bridge arm is connected with a second end of the second inductor. A first end of the energy storage element is connected with a first confluent end; a second end of the energy storage element is connected with a second confluent end. The controller is configured to control the first and second phase bridge arms to charge and discharge the battery through the first and second inductors to heat the (Continued)

battery. The first and second inductors are in different operating states.

20 Claims, 11 Drawing Sheets

(51) Int. Cl.

| | |
|---|---|
| *H01M 10/625* | (2014.01) |
| *H01M 10/63* | (2014.01) |
| *H01M 10/633* | (2014.01) |
| *H01M 10/65* | (2014.01) |
| *H02J 7/50* | (2026.01) |
| *H02J 7/90* | (2026.01) |

(52) U.S. Cl.
CPC ......... *H01M 10/63* (2015.04); *H01M 10/633* (2015.04); *H01M 10/65* (2015.04); *H02J 7/575* (2026.01); *H02J 7/90* (2026.01); *H01M 2220/20* (2013.01)

(58) Field of Classification Search
CPC .. H01M 10/63; H01M 10/633; H01M 10/637; H01M 10/65; H01M 10/657; H01M 10/6571; H01M 2220/20; H02J 7/007; H02J 7/007194; Y02E 60/10; Y02T 10/17
USPC .......................... 320/118, 129, 139, 150–153
See application file for complete search history.

(56) References Cited

U.S. PATENT DOCUMENTS

| | | | |
|---|---|---|---|
| 2021/0043990 A1* | 2/2021 | Dan ...................... | H01M 10/63 |
| 2021/0359348 A1* | 11/2021 | Zheng ................... | H02J 7/0068 |

FOREIGN PATENT DOCUMENTS

| | | | |
|---|---|---|---|
| CN | 105762434 A | | 7/2016 |
| CN | 108312878 A | | 7/2018 |
| CN | 108808173 A | | 11/2018 |
| CN | 109786878 A | | 5/2019 |
| CN | 109904540 A | | 6/2019 |
| CN | 109950659 A | | 6/2019 |
| CN | 109950660 A | | 6/2019 |
| CN | 110962631 A | | 4/2020 |
| CN | 110962631 A1 * | | 4/2020 |
| CN | 110970965 A | | 4/2020 |
| CN | 110970965 A1 * | | 4/2020 |
| CN | 110971173 A | | 4/2020 |
| CN | 210468040 U | | 5/2020 |
| JP | H09233709 A | | 9/1997 |
| JP | 2008060047 A | | 3/2008 |
| JP | 2018093608 A | | 6/2018 |
| JP | 2020080620 A | | 5/2020 |

* cited by examiner

FIG. 6a                    FIG. 6b

A first phase bridge arm and a second phase bridge arm are controlled if it is
determined that a battery is required to be heated, to charge and discharge the
battery through a first inductor and a second inductor to heat the battery, where
the first inductor and the second inductor are in different operating states          S71

BATTERY ENERGY PROCESSING DEVICE AND METHOD, AND VEHICLE

CROSS-REFERENCE TO RELATED APPLICATIONS

This application is the National Stage of PCT International Application No. PCT/CN2020/130178, filed on Nov. 19, 2020, which claims priority to Chinese Patent Application No. 202010476447.1, filed by BYD Co., Ltd. on May 29, 2020, and entitled "BATTERY ENERGY PROCESSING DEVICE AND METHOD, AND VEHICLE". The entire contents of the above-referenced applications are incorporated herein by reference.

FIELD

The present disclosure relates to the field of vehicle control, and more specifically, to a battery energy processing device and method, and a vehicle.

BACKGROUND

In order to solve the current shortage of petroleum energy and reduce urban air pollution, it is urgent to develop the electric vehicle industry. As the core power component of an electric vehicle, the charging and discharging performance of the power battery directly determines the driving performance and user experience of the electric vehicle. The discharge capacity of the power battery is greatly reduced in the low temperature environment, which greatly affects the continued driving range of the electric vehicle. As a result, the charging performance and charging time of the power battery in the low temperature environment cannot be guaranteed. In order to ensure that the power battery operates within a suitable temperature range to ensure the charging and discharging performance and operating life of the power battery, the power battery needs to be heated when necessary.

A vehicle-mounted high-power electronic device often produces serious electromagnetic interference, which leads to the increasingly prominent problem of electromagnetic compatibility of new energy vehicles. Defects of complex circuit topology and serious electromagnetic interference exist in most of the related arts for heating the power battery.

SUMMARY

An object of the present disclosure is to provide a battery energy processing device and method, and a vehicle with good electromagnetic compatibility.

In order to achieve the object, the present disclosure provides a battery energy processing device. The device includes:

a first inductor, where a first end of the first inductor is connected with a positive electrode of a battery;

a second inductor, where a first end of the second inductor is connected with the positive electrode of the battery;

a first phase bridge arm, where a midpoint of the first phase bridge arm is connected with a second end of the first inductor;

a second phase bridge arm, where a midpoint of the second phase bridge arm is connected with a second end of the second inductor; a first end of the first phase bridge arm and a first end of the second phase bridge arm are connected together to form a first confluent end; a second end of the first phase bridge arm and a second end of the second phase bridge arm are connected together to form a second confluent end; and the second confluent end is connected with a negative electrode of the battery;

an energy storage element, where a first end of the energy storage element is connected with the first confluent end; and a second end of the energy storage element is connected with the second confluent end; and a controller, configured to control the first phase bridge arm and the second phase bridge arm to charge and discharge the battery through the first inductor and the second inductor to heat the battery. The first inductor and the second inductor are in different operating states.

Optionally, the operating states include an energy storage state, a freewheeling state, and a non-operating state. The controller is configured to control the first phase bridge arm and the second phase bridge arm to charge and discharge the battery and the energy storage element through the first inductor and the second inductor to heat the battery.

Optionally, the controller is configured to control the first phase bridge arm and the second phase bridge arm to discharge the battery or the energy storage element to the first inductor to heat the battery, wherein the first inductor is in the energy storage state, and the second inductor is in the non-operating state.

Optionally, the controller is configured to control the first phase bridge arm and the second phase bridge arm to discharge one of the battery and the energy storage element to the second inductor and charge the other of the battery and the energy storage element through the first inductor to heat the battery. The second inductor is in the energy storage state, and the first inductor is in the freewheeling state.

Optionally, the controller is configured to control the first phase bridge arm and the second phase bridge arm to charge the battery or the energy storage element through the second inductor to heat the battery. The second inductor is in the freewheeling state, and the first inductor is in the non-operating state.

Optionally, the battery is a vehicle-mounted battery. The first inductor and the second inductor are inductors in a voltage converter of a vehicle. The first phase bridge arm and the second phase bridge arm are bridge arms in the voltage converter. The energy storage element is a bus capacitor.

Optionally, the battery is the vehicle-mounted battery. The first phase bridge arm and the second phase bridge arm are bridge arms in a motor controller of the vehicle. The energy storage element is the bus capacitor.

Optionally, the device further includes:

a first switch module, where a first end of the first switch module is connected with the positive electrode of the battery; and a second end of the first switch module is connected with the first end of the energy storage element;

a second switch module, where a first end of the second switch module is connected with the midpoint of the first phase bridge arm; and a second end of the second switch module is connected with a first phase winding of a motor; and a third switch module, where a first end of the third switch module is connected with the midpoint of the second phase bridge arm; and a second end of the third switch module is connected with a second phase winding of the motor, where the controller is configured to control the first switch module, the second switch module, and the third switch module to be turned off to heat the battery.

Optionally, the device further includes a fourth switch module. A first end of the fourth switch module is connected with the positive electrode of the battery. A second end of the fourth switch module is respectively connected with the first end of the first inductor and the first end of the second inductor.

The controller is further configured to control the fourth switch module to be turned off, and control the first switch module, the second switch module, and the third switch module to be turned on, so as to realize driving of the motor by the battery.

Optionally, the controller is configured to control the first phase bridge arm and the second phase bridge arm to cyclically charge and discharge the battery and the energy storage element through the first inductor and the second inductor to heat the battery. The first inductor and the second inductor are in different operating states.

The present disclosure further provides a battery energy processing method. The method includes:

controlling a first phase bridge arm and a second phase bridge arm if it is determined that a battery is required to be heated, to charge and discharge the battery through a first inductor and a second inductor to heat the battery, where the first inductor and the second inductor are in different operating states;

a first end of the first inductor is connected with a positive electrode of the battery; a first end of the second inductor is connected with the positive electrode of the battery; a midpoint of the first phase bridge arm is connected with a second end of the first inductor; a midpoint of the second phase bridge arm is connected with a second end of the second inductor; a first end of the first phase bridge arm and a first end of the second phase bridge arm are connected together to form a first confluent end; a second end of the first phase bridge arm and a second end of the second phase bridge arm are connected together to form a second confluent end; the second confluent end is connected with a negative electrode of the battery; a first end of an energy storage element is connected with the first confluent end; and a second end of the energy storage element is connected with the second confluent end.

Optionally, the operating states include an energy storage state, a freewheeling state, and a non-operating state.

The controlling a first phase bridge arm and a second phase bridge arm if it is determined that a battery is required to be heated, to charge and discharge the battery through a first inductor and a second inductor to heat the battery includes: controlling the first phase bridge arm and the second phase bridge arm if it is determined that the battery is required to be heated, to charge and discharge the battery and the energy storage element through the first inductor and the second inductor to heat the battery.

Optionally, the controlling the first phase bridge arm and the second phase bridge arm to charge and discharge the battery and the energy storage element through the first inductor and the second inductor to heat the battery includes:

controlling the first phase bridge arm and the second phase bridge arm to discharge the battery or the energy storage element to the first inductor to heat the battery, where the first inductor is in the energy storage state; and the second inductor is in the non-operating state; or controlling the first phase bridge arm and the second phase bridge arm to discharge one of the battery and the energy storage element to the second inductor and charge the other of the battery and the energy storage element through the first inductor to heat the battery, where the second inductor is in the energy storage state; and the first inductor is in the freewheeling state; or controlling the first phase bridge arm and the second phase bridge arm to charge the battery or the energy storage element through the second inductor to heat the battery, where the second inductor is in the freewheeling state; and the first inductor is in the non-operating state.

Optionally, the controlling the first phase bridge arm and the second phase bridge arm to charge and discharge the battery and the energy storage element through the first inductor and the second inductor includes:

controlling a lower bridge arm of the first phase bridge arm to be turned on, and controlling an upper bridge arm of the first phase bridge arm and an upper bridge arm and a lower bridge arm of the second phase bridge arm to be turned off, to cause the battery to charge the first inductor;

controlling the upper bridge arm of the first phase bridge arm and the lower bridge arm of the second phase bridge arm to be turned on, and controlling the lower bridge arm of the first phase bridge arm and the upper bridge arm of the second phase bridge arm to be turned off, to cause the battery to charge the second inductor and cause the first inductor to charge the energy storage element;

controlling the upper bridge arm of the second phase bridge arm to be turned on, and controlling the lower bridge arm of the second phase bridge arm and the upper bridge arm and the lower bridge arm of the first phase bridge arm to be turned off, to cause the second inductor to charge the energy storage element;

controlling the upper bridge arm of the second phase bridge arm to be turned on, and controlling the lower bridge arm of the second phase bridge arm and the upper bridge arm and the lower bridge arm of the first phase bridge arm to be turned off, to cause the energy storage element to charge the battery through the second inductor;

controlling the upper bridge arm of the first phase bridge arm and the lower bridge arm of the second phase bridge arm to be turned on, and controlling the lower bridge arm of the first phase bridge arm and the upper bridge arm of the second phase bridge arm to be turned off, to cause the energy storage element to charge the battery through the first inductor and cause the second inductor to charge the battery; and controlling the lower bridge arm of the first phase bridge arm to be turned on, and controlling the upper bridge arm of the first phase bridge arm and the upper bridge arm and the lower bridge arm of the second phase bridge arm to be turned off, to cause the first inductor to charge the battery.

Optionally, the controlling the first phase bridge arm and the second phase bridge arm to charge and discharge the battery and the energy storage element through the first inductor and the second inductor includes:

controlling a lower bridge arm of the first phase bridge arm to be turned on, and controlling an upper bridge arm of the first phase bridge arm and an upper bridge arm and a lower bridge arm of the second phase bridge arm to be turned off, to cause the battery to charge the first inductor;

controlling the upper bridge arm of the first phase bridge arm and the lower bridge arm of the second phase bridge arm to be turned on, and controlling the lower bridge arm of the first phase bridge arm and the upper bridge arm of the second phase bridge arm to be turned off, to cause the battery to charge the second inductor and cause the first inductor to charge the energy storage element;

controlling the upper bridge arm of the second phase bridge arm to be turned on, and controlling the lower bridge arm of the second phase bridge arm and the upper bridge arm and the lower bridge arm of the first phase bridge arm to be turned off, to cause the second inductor to charge the energy storage element;

controlling the upper bridge arm of the first phase bridge arm to be turned on, and controlling the lower bridge arm of the first phase bridge arm and the upper bridge arm and the lower bridge arm of the second phase bridge arm to be turned off, to cause the energy storage element to charge the battery through the first inductor;

controlling the lower bridge arm of the first phase bridge arm and the upper bridge arm of the second phase bridge arm to be turned on, and controlling the upper bridge arm of the first phase bridge arm and the lower bridge arm of the second phase bridge arm to be turned off, to cause the energy storage element to charge the battery through the second inductor and cause the first inductor to charge the battery; and controlling the lower bridge arm of the second phase bridge arm to be turned on, and controlling the upper bridge arm of the second phase bridge arm and the upper bridge arm and the lower bridge arm of the first phase bridge arm to be turned off, to cause the second inductor to charge the battery.

Optionally, in a stage in which one of the first inductor and the second inductor is in the energy storage state and the other is in the freewheeling state, after a bridge arm configured to perform freewheeling of the inductor is controlled to operate, a bridge arm configured to perform energy storage of the inductor is controlled to operate after a delay of a preset duration.

Optionally, a switching frequency or a duty cycle of the first phase bridge arm and the second phase bridge arm is adjusted during the heating to cause a value of a current flowing through the battery to reach an optimal current value.

Optionally, the adjusting a duty cycle of the first phase bridge arm and the second phase bridge arm during the heating to cause a value of a current flowing through the battery to reach an optimal current value includes:

adjusting a duty cycle of the first phase bridge arm and the second phase bridge arm in a next carrier frequency period during the heating according to a comparison result of the value of the current flowing through the battery and the optimal current value and the duty cycle of the first phase bridge arm and the second phase bridge arm in a present carrier frequency period, to cause the value of the current flowing through the battery to reach the optimal current value.

Optionally, the adjusting the duty cycle of the first phase bridge arm and the second phase bridge arm in a next carrier frequency period during the heating according to a comparison result of the value of the current flowing through the battery and the optimal current value and the duty cycle of the first phase bridge arm and the second phase bridge arm in a present carrier frequency period, to cause the value of the current flowing through the battery to reach the optimal current value includes:

during charging or discharging of the battery, controlling the first phase bridge arm and the second phase bridge arm to cause the duty cycle of the first phase bridge arm and the second phase bridge arm in the next carrier frequency period to be greater than the duty cycle in the present carrier frequency period if the value of the current flowing through the battery is less than the optimal current value; and controlling the first phase bridge arm and the second phase bridge arm to cause the duty cycle of the first phase bridge arm and the second phase bridge arm in the next carrier frequency period to be less than the duty cycle in the present carrier frequency period if the value of the current flowing through the battery is greater than the optimal current value, until the value of the current flowing through the battery reaches the optimal current value.

The present disclosure further provides a vehicle including a battery and the above battery energy processing device provided in the present disclosure.

Through the above technical solutions, the battery and the energy storage element are charged and discharged through the first inductor and the second inductor, so as to heat the battery. In addition, during the heating of the battery, the first inductor and the second inductor are in different operating states. Compared with the battery heating control method using one inductor or multiple inductors in a same operating state, through a control method of alternating two inductors in this solution, a ripple current in the circuit is relatively small when a same current is outputted, thereby significantly improving the electromagnetic compatibility performance of the battery energy processing device.

Other features and advantages of the present disclosure will be described in detail in the following detailed description part.

BRIEF DESCRIPTION OF THE DRAWINGS

The accompanying drawings are intended to provide further understanding of the present disclosure and constitute a part of this specification. The accompanying drawings and the specific implementations below are used together for explaining the present disclosure rather than constituting a limitation to the present disclosure. In the accompanying drawings:

FIG. 6a is a graph of currents varying with times in a circuit during heating with an inductor according to an exemplary embodiment.

FIG. 6b is a graph of currents varying with times in a circuit during heating with two inductors in this solution according to an exemplary embodiment.

DETAILED DESCRIPTION

Specific implementations of the present disclosure are described in detail below with reference to the accompanying drawings. It should be understood that the specific implementations described herein are merely used to describe and explain the present disclosure, but are not intended to limit the present disclosure.

Figure 1:
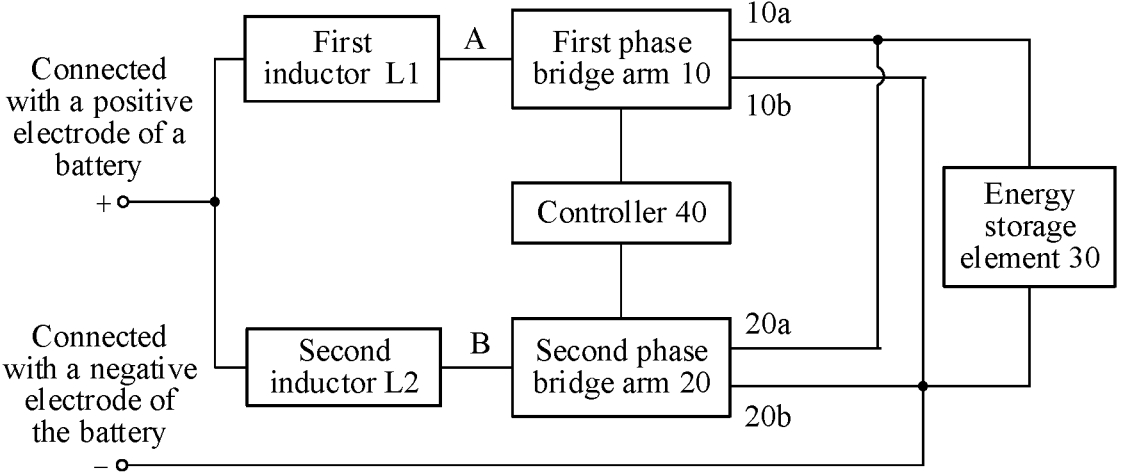
FIG. 1 is a structural block diagram of a battery energy processing device according to an exemplary embodiment.

FIG. 1 is a structural block diagram of a battery energy processing device according to an exemplary embodiment. The battery energy processing device may include a first inductor L1, a second inductor L2, a first phase bridge arm 10, a second phase bridge arm 20, an energy storage element 30, and a controller 40.

A first end (a left end) of the first inductor L1 is connected with a positive electrode (+) of a battery. A first end (a left end) of the second inductor L2 is connected with the positive electrode of the battery. A midpoint A of the first phase bridge arm 10 is connected with a second end (a right end) of the first inductor L1. A midpoint B of the second phase bridge arm 20 is connected with a second end (a right end) of the second inductor L2. A first end 10a of the first phase bridge arm 10 and a first end 20a of the second phase bridge arm 20 are connected together to form a first confluent end. A second end 10b of the first phase bridge arm 10 and a second end 20b of the second phase bridge arm 20 are connected together to form a second confluent end. The second confluent end is connected with a negative electrode (−) of the battery.

A first end (an upper end in FIG. 1) of the energy storage element 30 is connected with the first confluent end, and a second end (a lower end in FIG. 1) of the energy storage element 30 is connected with the second confluent end.

The controller 40 is respectively connected with the first phase bridge arm 10 and the second phase bridge arm 20. The controller 40 is configured to control the first phase bridge arm 10 and the second phase bridge arm 20 to charge and discharge the battery through the first inductor L1 and the second inductor L2 to heat the battery. The first inductor L1 and the second inductor L2 are in different operating states.

Figure 2:
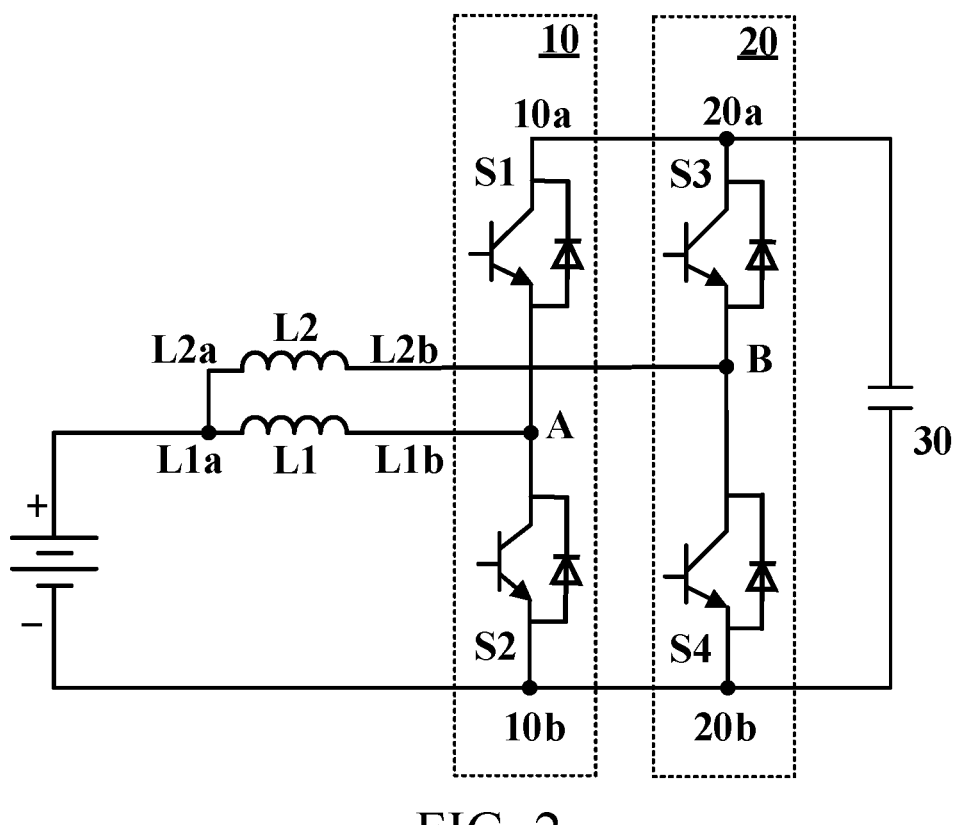
FIG. 2 is a schematic structural diagram of a circuit in a battery energy processing device according to an exemplary embodiment.

FIG. 2 is a schematic structural diagram of a circuit in a battery energy processing device according to an exemplary embodiment. As shown in FIG. 2, the first phase bridge arm 10 includes an upper bridge arm S1 and a lower bridge arm S2, and the second phase bridge arm 20 includes an upper bridge arm S3 and a lower bridge arm S4. In FIG. 2, each bridge arm exemplarily includes a triode and a diode connected in parallel. The triode may further be replaced with other switch transistors, such as an insulated gate bipolar transistor (IGBT), a metal-oxide-semiconductor field-effect transistor (MOSFET), and the like. In FIG. 2, the energy storage element 30 is exemplarily shown in the form of a capacitor, and the energy storage element 30 may further be other types of energy storage elements such as an inductor.

A first end L1a of the first inductor L1 is connected with a positive electrode (+) of a battery. A first end L2a of the second inductor L2 is connected with the positive electrode of the battery. A midpoint A of the first phase bridge arm 10 is connected with a second end L1b of the first inductor L1. A midpoint B of the second phase bridge arm 20 is connected with a second end L2b of the second inductor L2. A first end 10a of the first phase bridge arm 10 and a first end 20a of the second phase bridge arm 20 are connected together to form a first confluent end. A second end 10b of the first phase bridge arm 10 and a second end 20b of the second phase bridge arm 20 are connected together to form a second confluent end. The second confluent end is connected with a negative electrode (−) of the battery.

In this solution, the first inductor L1 and the second inductor L2 are always in different operating states during the heating of the battery, and are really used as two different inductors. The control method of alternating two inductors (among different operating states) in this solution can play the role of complementing and restricting each other to a certain extent. The ripple current in the circuit is relatively small and the electromagnetic compatibility is better. In addition, the heating of the battery is caused by heating of the internal resistance of the battery due to the current flowing through the battery when the battery is charged or discharged, and the battery heats up from inside to outside. Therefore, the heating efficiency of the battery is high.

According to the circuit structure diagram shown in FIG. 2, during the heating of the battery, it may be arranged to undergo multiple stages with different current flow directions. Correspondingly, the operating states of the two inductors may include an energy storage state, a freewheeling state, and a non-operating state. When the inductors are in the energy storage state, the inductors are charged, and a voltage at both ends of the inductors increases. When the inductors are in the freewheeling state, the inductors discharge, and a voltage at both ends of the inductors decreases. When the inductors are in the non-operating state, the inductors itself are not charged and doesn't discharged, and a voltage at both ends of the inductors remains unchanged.

On the basis of the above different operating states, specifically, the two inductors are respectively in two of the three states: the energy storage state, the freewheeling state, and the non-operating state. The diversification of the optional states not only diversifies settable current flow strategies, but also enables the comparison of several strategies through experiments and selection of a better current flow strategy with relatively small ripple currents from the several strategies.

In still another embodiment, the controller 40 is configured to control the first phase bridge arm 10 and the second phase bridge arm 20 to charge and discharge the battery and the energy storage element 30 through the first inductor L1 and the second inductor L2 to heat the battery.

The charging and discharging of the battery and the energy storage element 30 may include a process of charging the battery and discharging the energy storage element 30, and/or a process of discharging the battery and charging the energy storage element 30.

For example, FIGS. 3a-3f are respectively schematic diagrams of current directions at six stages in a current period according to an exemplary embodiment. In a current period of the embodiment, the controller may control the first phase bridge arm and the second phase bridge arm to perform the following six steps at six stages respectively.

Figures 3A, 3B:
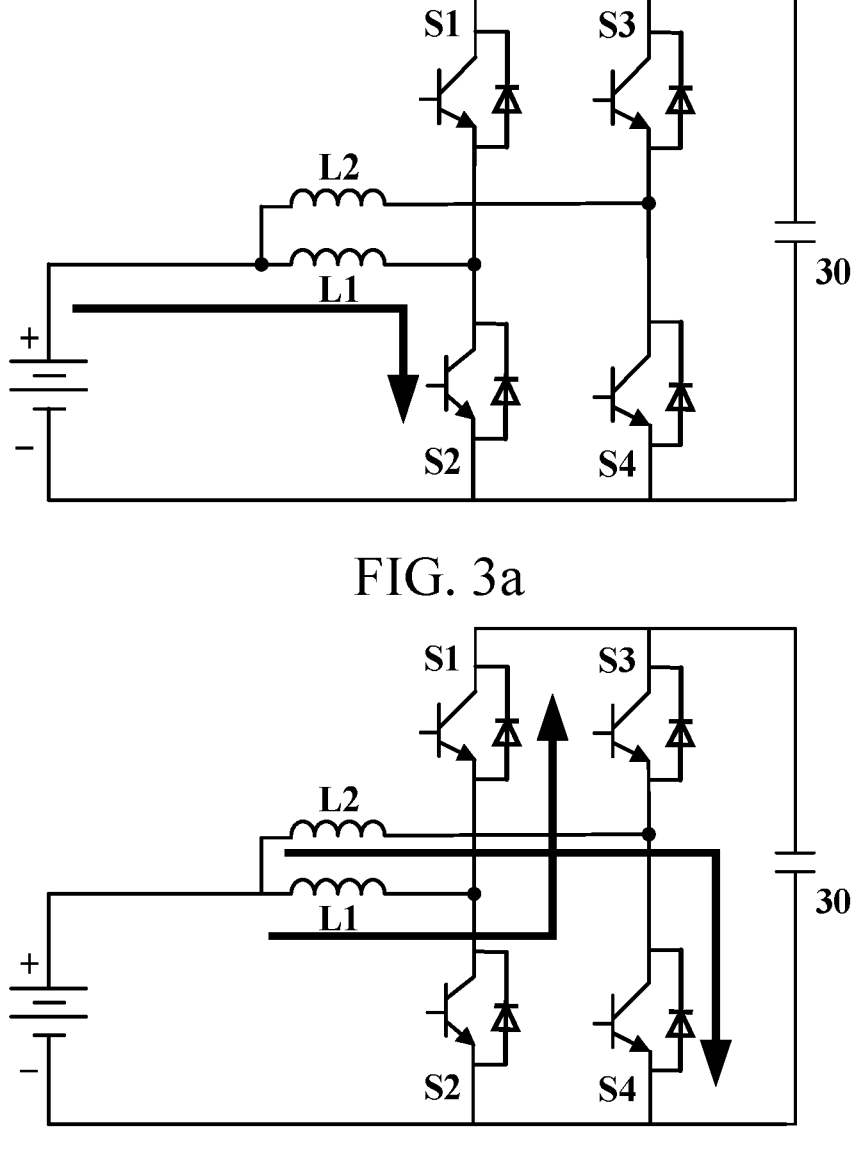
FIGS. 3a-3f are respectively schematic diagrams of current directions at six stages in a current period according to an exemplary embodiment.

1. A lower bridge arm S2 of the first phase bridge arm is controlled to be turned on, and an upper bridge arm S1 of the first phase bridge arm and an upper bridge arm S3 and a lower bridge arm S4 of the second phase bridge arm are controlled to be turned off, to cause the battery to charge the first inductor L1. As shown in FIG. 3a, after flowing out from a positive electrode of the battery, the current flows through the first inductor L1 and the lower bridge arm S2 of the first phase bridge arm to a negative electrode of the battery.

2. The upper bridge arm S1 of the first phase bridge arm and the lower bridge arm S4 of the second phase bridge arm are controlled to be turned on, and the lower bridge arm S2 of the first phase bridge arm and the upper bridge arm S3 of the second phase bridge arm are controlled to be turned off, to cause the battery to charge the second inductor L2 and cause the first inductor L1 to charge the energy storage element 30. As shown in FIG. 3b, after flowing out from the positive electrode of the battery, the current flows, in one path, through the first inductor L1, the upper bridge arm S1 of the first phase bridge arm, and the energy storage element 30 to the negative electrode of the battery, and flows, in an other path, through the second inductor L2 and the lower bridge arm S4 of the second phase bridge arm to the negative electrode of the battery.

Figure 3C:
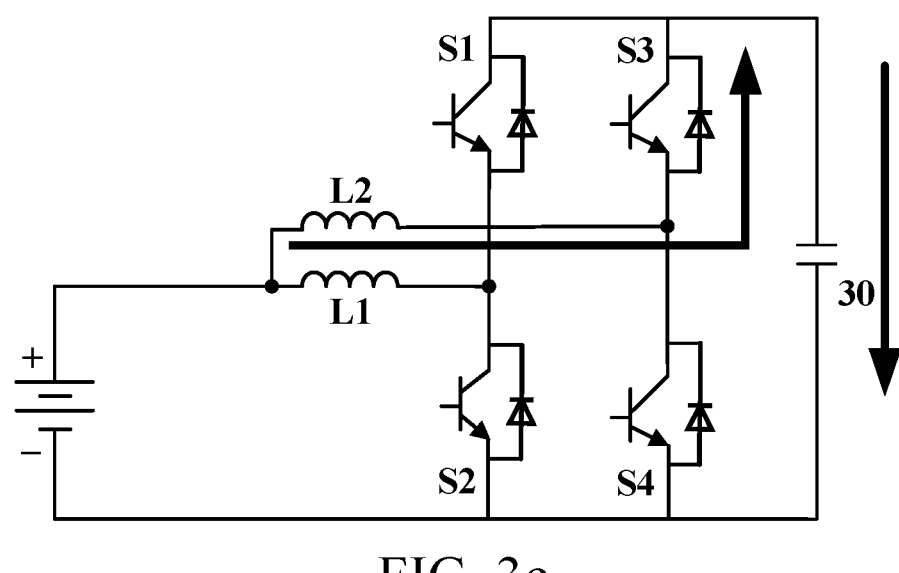

3. The upper bridge arm S3 of the second phase bridge arm is controlled to be turned on, and the lower bridge arm S4 of the second phase bridge arm and the upper bridge arm S1 and the lower bridge arm S2 of the first phase bridge arm are controlled to be turned off, to cause the second inductor L2 to charge the energy storage element 30. As shown in FIG. 3c, after flowing out from the positive electrode of the battery, the current flows through the second inductor L2, the upper bridge arm S3 of the second phase bridge arm, and the energy storage element 30 to the negative electrode of the battery.

Figures 3D, 3E:
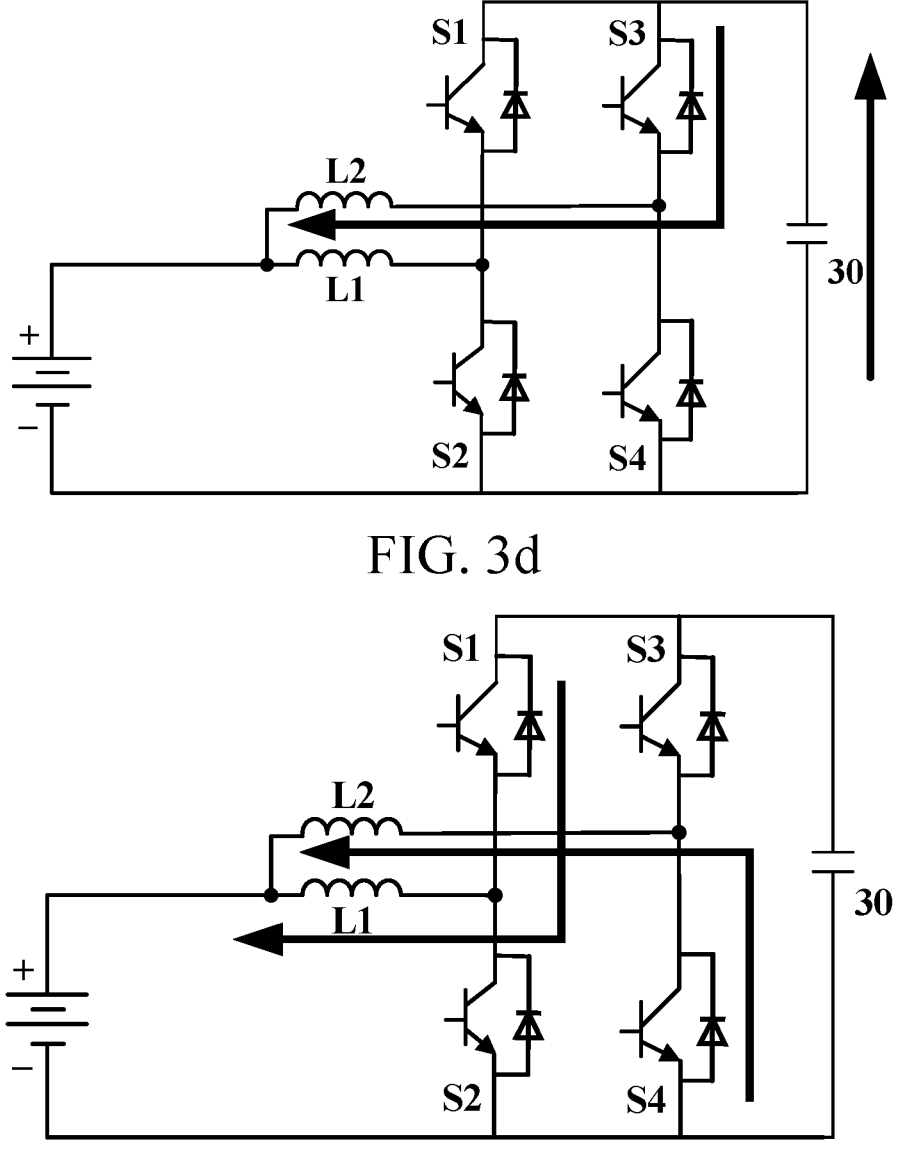

4. The upper bridge arm S3 of the second phase bridge arm is controlled to be turned on, and the lower bridge arm S4 of the second phase bridge arm and the upper bridge arm S1 and the lower bridge arm S2 of the first phase bridge arm are controlled to be turned off, to cause the energy storage element 30 to charge the battery through the second inductor L2. As shown in FIG. 3d, after flowing out from the negative electrode of the battery, the current flows through the energy storage element 30, the upper bridge arm S3 of the second phase bridge arm, and the second inductor L2 to the positive electrode of the battery.

5. The upper bridge arm S1 of the first phase bridge arm and the lower bridge arm S4 of the second phase bridge arm are controlled to be turned on, and the lower bridge arm S2 of the first phase bridge arm and the upper bridge arm S3 of the second phase bridge arm are controlled to be turned off, to cause the energy storage element 30 to charge the battery through the first inductor L1 and charge the battery through the second inductor L1. As shown in FIG. 3e, after flowing out from the negative electrode of the battery, the current flows, in one path, through the energy storage element 30, the upper bridge arm S1 of the first phase bridge arm, and the first inductor L1 to the positive electrode of the battery, and flows, in an other path, through the lower bridge arm S4 of the second phase bridge arm and the second inductor L2 to the positive electrode of the battery.

Figure 3F:
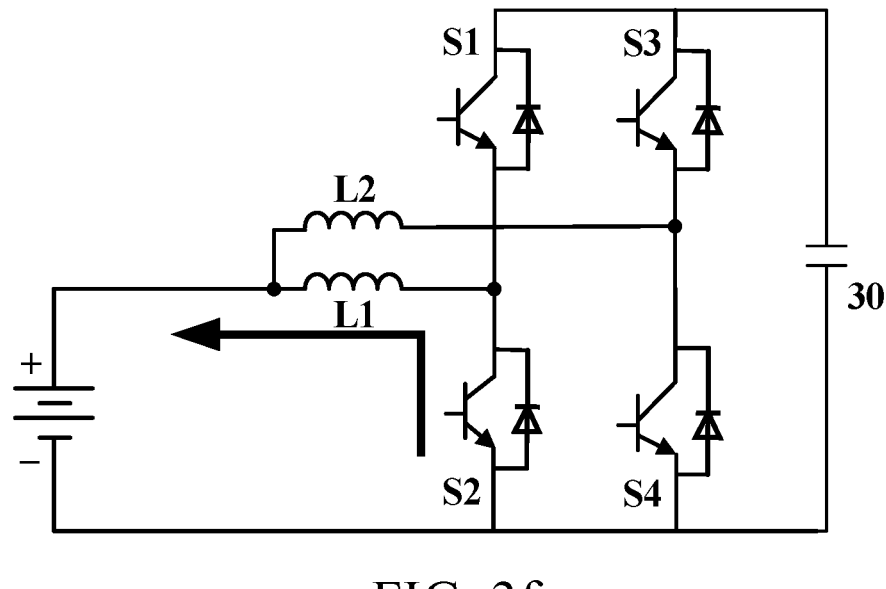

6. The lower bridge arm S2 of the first phase bridge arm is controlled to be turned on, and the upper bridge arm S1 of the first phase bridge arm and the upper bridge arm S3 and the lower bridge arm S4 of the second phase bridge arm are controlled to be turned off, to charge the battery through the first inductor L1. As shown in FIG. 3f, after flowing out from the negative electrode of the battery, the current flows through the lower bridge arm S2 of the first phase bridge arm and the first inductor L1 to the positive electrode of the battery.

In the embodiment, in the above switching from the third stage to the fourth stage, it is not necessary to control the operations of the bridge arms, but to switch the state by charging and then automatically discharging the energy storage element 30. In this way, in a case that the current period has a same number of steps, the operations of controlling by the controller are reduced, and the control flow of the controller is simplified, to heat the battery more reliably.

Figures 4A, 4B:
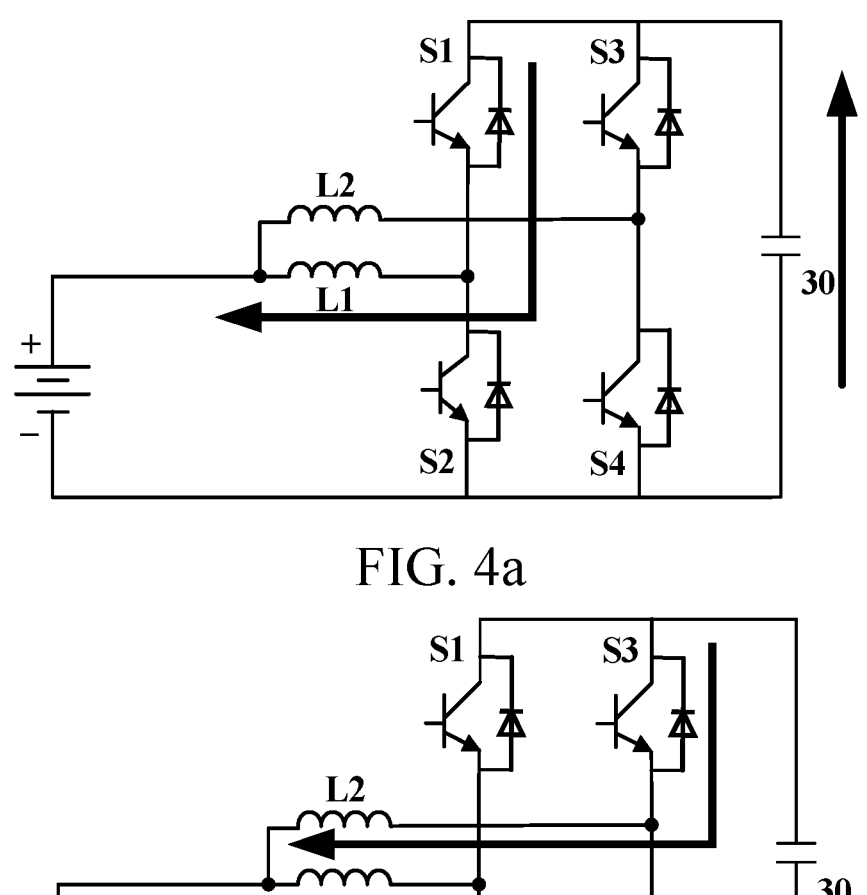
FIGS. 4a-4c are respectively schematic diagrams of current directions at last three stages in a current period according to another exemplary embodiment.
Figure 4C:
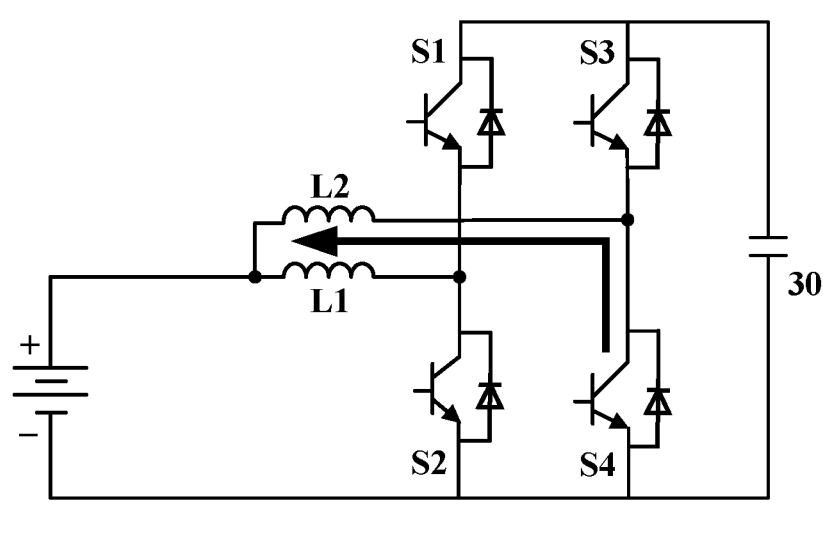

In another embodiment, the controller may also control six steps to be performed at six stages respectively. In one current period of the embodiment, first three stages may be the same as first three stages in the previous embodiment (FIGS. 3a-3c). FIGS. 4a-4c are respectively schematic diagrams of current directions at last three stages in a current period according to another exemplary embodiment.

At a fourth stage, the upper bridge arm S1 of the first phase bridge arm is controlled to be turned on, and the lower bridge arm S2 of the first phase bridge arm and the upper bridge arm S3 and the lower bridge arm S4 of the second phase bridge arm are controlled to be turned off, to cause the energy storage element 30 to charge the battery through the first inductor L1. As shown in FIG. 4a, after flowing out from a negative electrode of the battery, the current flows through the energy storage element 30, the upper bridge arm S1 of the first phase bridge arm, and the first inductor L1 to a positive electrode of the battery.

At a fifth stage, the lower bridge arm S2 of the first phase bridge arm and the upper bridge arm S3 of the second phase bridge arm are controlled to be turned on, and the upper bridge arm S1 of the first phase bridge arm and the lower bridge arm S4 of the second phase bridge arm are controlled to be turned off, to cause the energy storage element 30 to charge the battery through the second inductor L2 and charge the battery through the first inductor L1. As shown in FIG. 4b, after flowing out from the negative electrode of the battery, the current flows, in one path, through the energy storage element 30, the upper bridge arm S3 of the second phase bridge arm, and the second inductor L2 to the positive electrode of the battery, and flows, in an other path, through the lower bridge arm S2 of the first phase bridge arm and the first inductor L1 to the positive electrode of the battery.

At a sixth stage, the lower bridge arm S4 of the second phase bridge arm is controlled to be turned on, and the upper bridge arm S3 of the second phase bridge arm and the upper bridge arm S1 and the lower bridge arm S2 of the first phase bridge arm are controlled to be turned off, to charge the battery through the second inductor L2. As shown in FIG. 4c, after flowing out from the second inductor L2, the current flows through the battery and the lower bridge arm S4 of the second phase bridge arm to the second inductor L2.

Compared with the previous embodiment (FIGS. 3a-3f), in the embodiment (FIGS. 3a-3c and FIGS. 4a-4c), the current period has a same number of steps, and the controller actively controls each step, to cause the electric potential energy to be relatively great and cause the heating efficiency of the battery to be relatively high.

In the solution of the present disclosure, the states of the first inductor and the second inductor may have several different combinations. FIGS. 3a-3c and FIGS. 4a-4c are used as embodiments of one current period by way of example, wherein the six stages of one current period may include three combinations.

A first combination is that the first inductor is in an energy storage state and the second inductor is in a non-operating state, including the stages of FIG. 3a and FIG. 4a. The controller is configured to control the first phase bridge arm and the second phase bridge arm to discharge the battery or the energy storage element 30 to the first inductor L1 to heat the battery. In the stage of FIG. 3a, the battery is discharged to the first inductor L1, and in the stage of FIG. 4a, the energy storage element 30 is discharged to the first inductor L1.

In this combination, only one inductor is used to store energy. Since the other inductor does not operate, a current flowing through the battery is limited to a certain extent to be not excessively large, to cause the generated ripple current to be relatively small.

A second combination is that the second inductor is in the energy storage state, and the first inductor is in a freewheeling state, including the stages of FIG. 3b and FIG. 4b. The controller is configured to control the first phase bridge arm and the second phase bridge arm to discharge one of the battery and the energy storage element 30 to the second inductor L2 and charge the other of the battery and the energy storage element 30 through the first inductor L1 to heat the battery.

In the stage of FIG. 3*b*, the battery is discharged to the second inductor L2, and the energy storage element 30 is charged through the first inductor L1. In the stage of FIG. 4*b*, the energy storage element 30 is discharged to the second inductor L2, and the battery is charged through the first inductor L1.

In this combination, one inductor is configured store energy and the other inductor is configured for freewheeling. Although the two inductors operate simultaneously, the two inductors tend to be interlaced and complement each other, and therefore the heating efficiency is enhanced while avoiding relatively large ripple currents.

A third combination is that the second inductor is in the freewheeling state, and the first inductor is in the non-operating state, including the stages of FIG. 3*c* and FIG. 4*c*. The controller is configured to control the first phase bridge arm and the second phase bridge arm to charge the battery or the energy storage element through the second inductor to heat the battery. In the stage of FIG. 3*c*, the energy storage element is charged through the second inductor. In the stage of FIG. 4*c*, the battery is charged through the second inductor.

In this combination, only one inductor is used for free-wheeling. Since the other inductor does not operate, a current flowing through the battery is limited to a certain extent to be not excessively large, to cause the generated ripple current to be relatively small.

The circuit structure in FIG. 2 may be set as a circuit dedicated to battery heating, and may also multiplex circuits in related devices which are in a same device with the battery. For example, the battery is a vehicle-mounted battery. The first inductor and the second inductor are inductors in a voltage converter of a vehicle. The first phase bridge arm and the second phase bridge arm are bridge arms in the voltage converter. The energy storage element is a bus capacitor. The voltage converter may be a boost direct current (DC) module. In another example, the battery is the vehicle-mounted battery. The first phase bridge arm and the second phase bridge arm are bridge arms in a motor controller of the vehicle. The energy storage element is the bus capacitor.

In this way, for a device with a similar structure of a circuit, the circuit in the device can be multiplexed when the device is not operating, so as to save the arrangement of hardware, reduce circuit connections, save space, not increase the volume of the device, facilitate the miniaturization of the device, not change the original structure of the vehicle, and realize heating of the battery and low costs of the solution.

Figure 5:
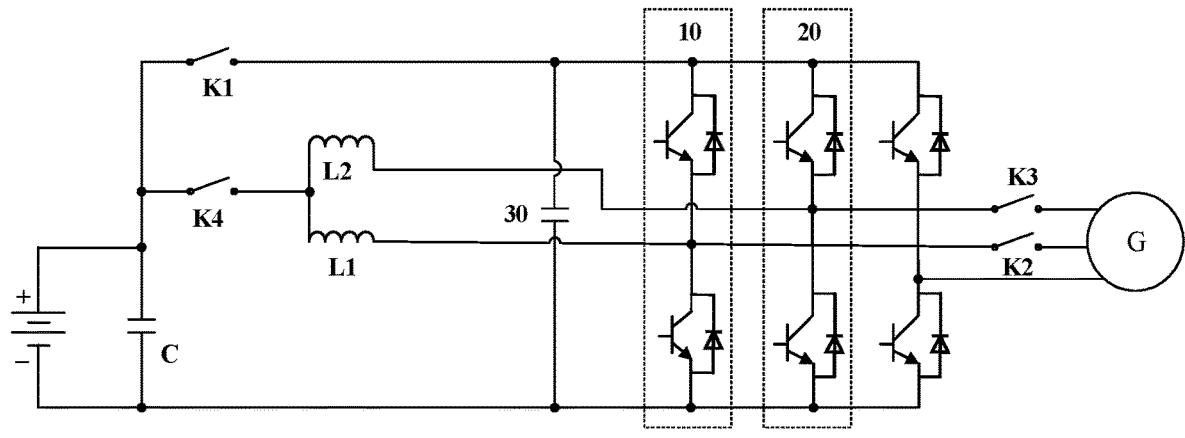
FIG. 5 is a schematic structural diagram of a circuit in a battery energy processing device according to another exemplary embodiment.

If circuit in other devices is multiplexed, a switch module may be arranged in the circuit, and the purpose of switching functions of the multiplexed circuit can be achieved by controlling the opening and closing of the switch module. FIG. 5 is a schematic structural diagram of a circuit in a battery energy processing device according to another exemplary embodiment. In the embodiment of FIG. 5, the battery is a vehicle-mounted battery, and the circuit in the motor controller of the vehicle is multiplexed. On the basis of FIG. 2, the battery energy processing device may further include a first switch module K1, a second switch module K2, and a third switch module K3.

A first end of the first switch module K1 (a left end of K1 in FIG. 5) is connected with a positive electrode of the battery, and a second end of the first switch module K1 (a right end of K1 in FIG. 5) is connected with a first end of the energy storage element 30 (an upper end of the energy storage element 30 in FIG. 5).

A first end of the second switch module K2 (a left end of K2 in FIG. 5) is connected with a midpoint of a first phase bridge arm 10, and a second end of the second switch module K2 (a right end of K2 in FIG. 5) is connected with a first phase winding of a motor G (not shown).

A first end of the third switch module K3 (a left end of K3 in FIG. 5) is connected with a midpoint of a second phase bridge arm 20, and a second end of the third switch module K3 (a right end of K3 in FIG. 5) is connected with a second phase winding of the motor G (not shown).

In the embodiment, the controller is configured to control the first switch module K1, the second switch module K2, and third switch module K3 to be turned off to heat the battery. If K1, K2 and K3 are turned off, the first phase bridge arm 10 and the second phase bridge arm 20 stop controlling the motor and change to be used for heating the battery. The design and control strategy of the circuit are relatively simple to perform quick switching to a battery heating function and achieve high reliability.

As shown in FIG. 5, the device may further include a fourth switch module K4. A first end of the fourth switch module K4 (the left end of K4 in FIG. 5) is connected with the positive electrode of the battery, and the second end of the fourth switch module K4 (the right end of K4 in FIG. 5) is respectively connected with the first end of the first inductor L1 (the left end of L1 in FIG. 5) and the first end of the second inductor L2 (the left end of L2 in FIG. 5).

In the embodiment, the controller is further configured to control the fourth switch module K4 to be turned off, and control the first switch module K1, the second switch module K2, and the third switch module K3 to be turned on, so as to realize driving of the motor by the battery. A capacitor C is the bus capacitor. It can be seen from FIG. 5 that if K4 is turned off and K1, K2, and K3 are turned on, the first inductor L1 and the second inductor L2 are turned off in the circuit, and the control of the motor G can be realized through the three-phase bridge arm. That is to say, the circuit is switched to function as a motor controller. The design and the control strategy of the switching circuit are relatively simple. The switching circuit can perform quick switching to a motor driving function, and is highly reliable.

The above embodiments describe the operations of the bridge arms, current flow directions, and charging and discharging states in one current period. In still another embodiment, the controller may be configured to control the first phase bridge arm and the second phase bridge arm to cyclically charge and discharge the battery and the energy storage element through the first inductor and the second inductor to heat the battery. The first inductor and the second inductor are in different operating states. That is to say, the above current period may be performed cyclically until a condition of stopping the heating of the battery is reached. The condition of stopping the heating of the battery may be, for example, that the temperature of the battery reaches a predetermined temperature threshold.

In this embodiment, the predetermined steps are cyclically performed to achieve the purpose of continuously charging the battery. In addition, the control strategy is simple, not prone to errors, and has high reliability.

FIG. 6*a* is a graph of currents varying with times in a circuit during heating with an inductor according to an exemplary embodiment. FIG. 6b is a graph of currents varying with times in a circuit during heating with two inductors in this solution according to an exemplary embodiment. The abscissa is the time, and the ordinate is the current in the circuit, that is, the current flowing through the power battery. As shown in FIG. 6a and FIG. 6b, when only one inductor is used for heating, the ripple current in the curve is relatively large, while when two inductors are used for heating, the ripple current in the curve is obviously smaller than that in the curve when only one inductor is used. It can be seen that when the solution of the present disclosure is used to heat the battery, a ripple current in the circuit is relatively small when a same current is outputted, thereby significantly improving the electromagnetic compatibility performance of the battery energy processing device.

Figure 7:
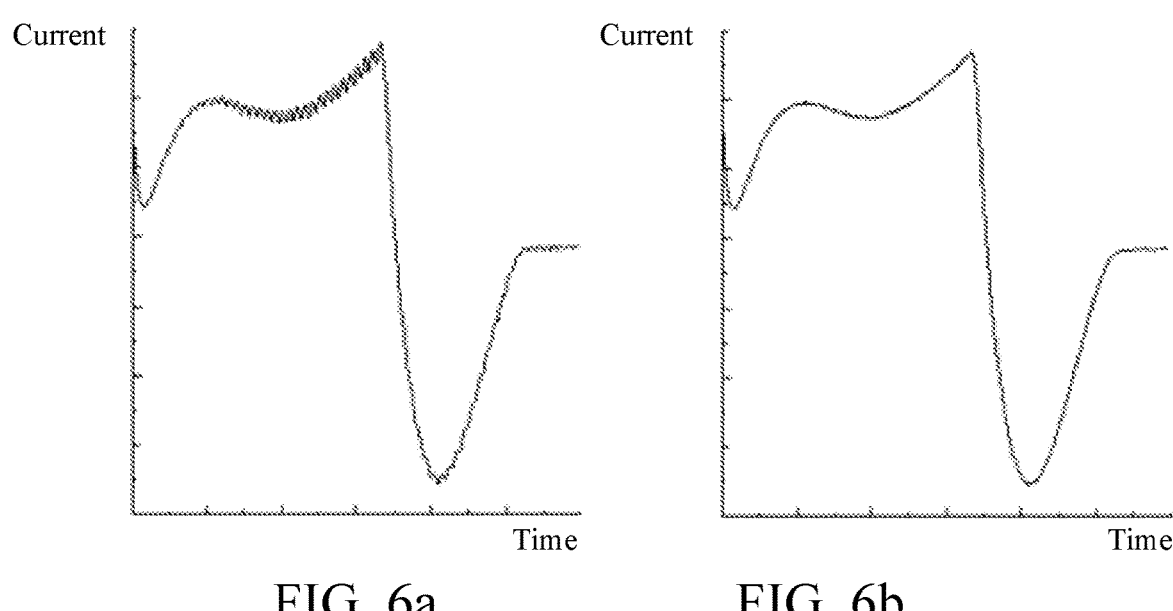
FIG. 7 is a flowchart of a battery energy processing method according to an exemplary embodiment.

The present disclosure further provides a battery energy processing method. FIG. 7 is a flowchart of a battery energy processing method according to an exemplary embodiment. As shown in FIG. 7, the method may include step S71 of controlling a first phase bridge arm and a second phase bridge arm if it is determined that a battery is required to be heated, to charge and discharge the battery through a first inductor and a second inductor to heat the battery. The first inductor and the second inductor are in different operating states.

A first end of the first inductor is connected with a positive electrode of the battery. A first end of the second inductor is connected with the positive electrode of the battery. A midpoint of the first phase bridge arm is connected with a second end of the first inductor. A midpoint of the second phase bridge arm is connected with a second end of the second inductor. A first end of the first phase bridge arm and a first end of the second phase bridge arm are connected together to form a first confluent end. A second end of the first phase bridge arm and a second end of the second phase bridge arm are connected together to form a second confluent end. The second confluent end is connected with a negative electrode of the battery. A first end of an energy storage element is connected with the first confluent end. A second end of the energy storage element is connected with the second confluent end.

In this solution, the first inductor and the second inductor are always in different operating states during the heating of the battery, and are really used as two different inductors. Compared with the battery heating control method using one inductor or multiple inductors in a same operating state, the control method of alternating two inductors (among different operating states) in this solution can play the role of complementing and restricting each other to a certain extent. The ripple current in the circuit is relatively small when a same current is outputted, thereby significantly improving the electromagnetic compatibility performance of the battery energy processing device.

Optionally, the operating states of the two inductors may include an energy storage state, a freewheeling state, and a non-operating state. The step (step S71) of controlling the first phase bridge arm and the second phase bridge arm if it is determined that the battery is required to be heated, to charge and discharge the battery through the first inductor and the second inductor to heat the battery, may include: controlling the first phase bridge arm and the second phase bridge arm if it is determined that the battery is required to be heated, to charge and discharge the battery and the energy storage element through the first inductor and the second inductor to heat the battery.

On the basis of the above different operating states, specifically, the two inductors are respectively in two of the three states: the energy storage state, the freewheeling state, and the non-operating state. The diversification of the optional states not only diversifies settable current flow strategies, but also enables the comparison of several strategies through experiments and selection of a better current flow strategy with relatively small ripple currents from the several strategies.

Optionally, the step of controlling the first phase bridge arm and the second phase bridge arm to charge and discharge the battery and the energy storage element through the first inductor and the second inductor to heat the battery, may include: controlling the first phase bridge arm and the second phase bridge arm to discharge the battery or the energy storage element to the first inductor to heat the battery, wherein the first inductor is in the energy storage state, and the second inductor is in the non-operating state; or may include: controlling the first phase bridge arm and the second phase bridge arm to discharge one of the battery and the energy storage element to the second inductor and the other of the battery and charge the energy storage element through the first inductor to heat the battery, wherein the second inductor is in the energy storage state, and the first inductor is in the freewheeling state; or may include: controlling the first phase bridge arm and the second phase bridge arm to charge the battery or the energy storage element through the second inductor to heat the battery, wherein the second inductor is in the freewheeling state, and the first inductor is in the non-operating state.

When one inductor operates and the other does not operate, a current flowing through the battery is limited to a certain extent to be not excessively large, to cause the generated ripple current to be relatively small. When one inductor is configured to store energy and the other inductor is configured for freewheeling, although the two inductors operate simultaneously, the two inductors tend to be interlaced and complement each other, and therefore the heating efficiency is enhanced while avoiding relatively large ripple currents.

Optionally, the step of controlling the first phase bridge arm and the second phase bridge arm to charge and discharge the battery and the energy storage element through the first inductor and the second inductor may include the following steps.

1. A lower bridge arm of the first phase bridge arm is controlled to be turned on, and an upper bridge arm of the first phase bridge arm and an upper bridge arm and a lower bridge arm of the second phase bridge arm are controlled to be turned off, to cause the battery to charge the first inductor.

2. The upper bridge arm of the first phase bridge arm and the lower bridge arm of the second phase bridge arm are controlled to be turned on, and the lower bridge arm of the first phase bridge arm and the upper bridge arm of the second phase bridge arm are controlled to be turned off, to cause the battery to charge the second inductor and charge the energy storage element through the first inductor.

3. The upper bridge arm of the second phase bridge arm is controlled to be turned on, and the lower bridge arm of the second phase bridge arm and the upper bridge arm and the lower bridge arm of the first phase bridge arm are controlled to be turned off, to charge the energy storage element through the second inductor.

4. The upper bridge arm of the second phase bridge arm is controlled to be turned on, and the lower bridge arm of the second phase bridge arm and the upper bridge arm and the lower bridge arm of the first phase bridge arm are controlled to be turned off, to cause the energy storage element to charge the battery through the second inductor.

5. The upper bridge arm of the first phase bridge arm and the lower bridge arm of the second phase bridge arm are controlled to be turned on, and the lower bridge arm of the first phase bridge arm and the upper bridge arm of the second phase bridge arm are controlled to be turned off, to cause the energy storage element to charge the battery through the first inductor and charge the battery through the second inductor.

6. The lower bridge arm of the first phase bridge arm is controlled to be turned on, and the upper bridge arm of the first phase bridge arm and the upper bridge arm and the lower bridge arm of the second phase bridge arm are controlled to be turned off, to charge the battery through the first inductor.

In the embodiment, in the above switching from the third stage to the fourth stage, it is not necessary to control the operations of the bridge arms, but to switch the state by charging and then automatically discharging the energy storage element. In this way, in a case that the current period has a same number of steps, the operations of controlling by the controller are reduced, and the control flow of the controller is simplified to heat the battery more reliably.

Optionally, the step of controlling the first phase bridge arm and the second phase bridge arm to charge and discharge the battery and the energy storage element through the first inductor and the second inductor may include the following steps.

1. A lower bridge arm of the first phase bridge arm is controlled to be turned on, and an upper bridge arm of the first phase bridge arm and an upper bridge arm and a lower bridge arm of the second phase bridge arm are controlled to be turned off, to cause the battery to charge the first inductor.

2. The upper bridge arm of the first phase bridge arm and the lower bridge arm of the second phase bridge arm are controlled to be turned on, and the lower bridge arm of the first phase bridge arm and the upper bridge arm of the second phase bridge arm are controlled to be turned off, to cause the battery to charge the second inductor and cause the first inductor to charge the energy storage element.

3. The upper bridge arm of the second phase bridge arm is controlled to be turned on, and the lower bridge arm of the second phase bridge arm and the upper bridge arm and the lower bridge arm of the first phase bridge arm are controlled to be turned off, to cause the second inductor to charge the energy storage element.

4. The upper bridge arm of the first phase bridge arm is controlled to be turned on, and the lower bridge arm of the first phase bridge arm and the upper bridge arm and the lower bridge arm of the second phase bridge arm are controlled to be turned off, to cause the energy storage element to charge the battery through the first inductor.

5. The lower bridge arm of the first phase bridge arm and the upper bridge arm of the second phase bridge arm are controlled to be turned on, and the upper bridge arm of the first phase bridge arm and the lower bridge arm of the second phase bridge arm are controlled to be turned off, to cause the energy storage element to charge the battery through the second inductor and charge the battery through the first inductor.

6. The lower bridge arm of the second phase bridge arm is controlled to be turned on, and the upper bridge arm of the second phase bridge arm and the upper bridge arm and the lower bridge arm of the first phase bridge arm are controlled to be turned off, to charge the battery through the second inductor.

In this embodiment, the controller actively controls each step, to cause the electric potential energy to be relatively great and the heating efficiency of the battery to be relatively high.

Regarding the method in the above embodiments, a specific manner in which the operation is performed in each step has been described in detail in the embodiments related to the device, and the details will not be described herein.

In still another embodiment, in a stage in which one of the first inductor and the second inductor is in the energy storage state and the other is in the freewheeling state, after a bridge arm configured to perform freewheeling of the inductor is controlled to operate, a bridge arm configured to perform energy storage of the inductor is controlled to operate after a delay of a preset duration.

The preset duration may be set according to a switching period of a switch transistor in the bridge arm. For example, the preset duration may be a half period of the switch transistor in the bridge arm.

For example, in the stage of FIG. 3b, it is necessary to control the lower bridge arm S2 of the first phase bridge arm configured to perform freewheeling of the first inductor L1 to be turned off, and control the lower bridge arm S4 of the second phase bridge arm configured to perform energy storage of the second inductor L2 to be turned on. Then the lower bridge arm S2 of the first phase bridge arm is controlled to be turned off, and after the turn-off, the lower bridge arm S4 of the second phase bridge arm is controlled to be turned on after a half period of the switch transistor in the bridge arm.

In another example, in the stage of FIG. 3e, it is necessary to control the upper bridge arm S1 of the first phase bridge arm configured to perform energy storage of the first inductor L1 to be turned on, and control the upper bridge arm S3 of the second phase bridge arm configured to perform freewheeling of the second inductor L2 to be turned off. Then the upper bridge arm S3 of the second phase bridge arm is controlled to be turned off, and after the turn-off, the upper bridge arm S1 of the first phase bridge arm is controlled to be turned on after a half period of the switch transistor in the bridge arm.

Through the above delaying operation, the bridge arms are switched alternately, to cause the other inductor to start to store energy after the freewheeling of one inductor starts for a period of time. In this way, the current impact can be reduced, and the electric charge can be transferred slowly, which is in line with the charging and discharging characteristics of the inductors and can help prolong the service life of the device.

In still another embodiment, a switching frequency or a duty cycle of the first phase bridge arm and the second phase bridge arm can be adjusted during the heating, to cause a value of a current flowing through the battery to reach an optimal current value.

The optimal current value is an ideal value of a current flowing through the battery by considering the characteristics of the battery and the circuit. If the first phase bridge arm and the second phase bridge arm are bridge arms in the voltage converter, the optimal current value may be the smaller of the maximum allowable current value of the battery and the maximum allowable current value of the voltage converter.

The maximum allowable current value of the battery is related to factors such as battery SOC, temperature, alternating frequency, voltage, single-period redischarge capacity, and the like. The maximum allowable current value of the voltage converter is mainly limited by junction temperature of an IGBT module chip and temperature of an inductor coil sensor. According to the current IGBT chip temperature collected by the message, the current temperature collected by the inductor coil sensor, and a torque-limiting temperature of the IGBT chip and the inductor coil sensor, the maximum allowable current of the voltage converter can be obtained by looking up the table.

Specifically, the optimal current value can be obtained by using the following formula:

$$I(f)=\min(I\_max1,I\_max2)$$

$$I\_max1=C*f$$

$$I\_max2=(U\_max\text{-}OCV)/(R\_ac(f))$$

I(f) is the optimal current value, I_max1 is the maximum allowable current value of the battery, I_max2 is the maximum allowable current value of the voltage converter, min is the minimum value, C is the capacity that cannot be exceeded during pulse charging and discharging in one cycle, f is an alternating frequency of the battery, U_max is the maximum voltage of the battery, OCV is an open-circuit voltage, and R_ac (f) is a function of the AC internal resistance of the battery varying with f.

In the embodiment, by adjusting the switching frequency or duty cycle of the first phase bridge arm and the second phase bridge arm, the current value flowing through the battery reaches the optimal current value, which utilizes a simple method to gradually maximize the heating efficiency of the battery, the control is simple, and the reliability is high.

In still another embodiment, the step of adjusting a duty cycle of the first phase bridge arm and the second phase bridge arm during the heating to cause a value of a current flowing through the battery to reach an optimal current value may include:

adjusting the duty cycle of the first phase bridge arm and the second phase bridge arm in a next carrier frequency period during the heating according to a comparison result of the value of the current flowing through the battery and the optimal current value and the duty cycle of the first phase bridge arm and the second phase bridge arm in a present carrier frequency period, to cause the value of the current flowing through the battery to reach the optimal current value.

That is to say, the duty cycle of the first phase bridge arm and the second phase bridge arm in each carrier frequency period is to be adjusted according to the duty cycle in the previous carrier frequency period to gradually achieve the optimal duty cycle (corresponds to the optimal current value). In this way, the adjustment frequency of the duty cycle is relatively high, to quickly achieve the optimal duty cycle and the optimal current value and rapidly improve the heating efficiency of the battery.

In still another embodiment, the step of adjusting the duty cycle of the first phase bridge arm and the second phase bridge arm in a next carrier frequency period during the heating according to a comparison result of the value of the current flowing through the battery and the optimal current value and the duty cycle of the first phase bridge arm and the second phase bridge arm in a present carrier frequency period, to cause the value of the current flowing through the battery to reach the optimal current value may include:

during charging or discharging of the battery, controlling the first phase bridge arm and the second phase bridge arm to cause the duty cycle of the first phase bridge arm and the second phase bridge arm in the next carrier frequency period to be greater than the duty cycle in the present carrier frequency period if the value of the current flowing through the battery is less than the optimal current value; and controlling the first phase bridge arm and the second phase bridge arm to cause the duty cycle of the first phase bridge arm and the second phase bridge arm in the next carrier frequency period to be less than the duty cycle in the present carrier frequency period if the value of the current flowing through the battery is greater than the optimal current value, until the value of the current flowing through the battery reaches the optimal current value.

That is to say, through the closed-loop control of the duty cycle, the current in the circuit is finally at the optimal current value (or the heating is stopped before reaching the optimal current value because the heating stop condition is satisfied). Specifically, an initial duty cycle may be pre-determined, and the step size for adjustment to the duty cycle may be pre-determined. In the closed-loop control process of the duty cycle, the initial duty cycle and the step size can be used to adjust the duty cycle in the next carrier frequency period. In this way, the safety of the battery energy processing device can be ensured, the heating efficiency can be improved, and the heating time can be shortened.

Figure 8:
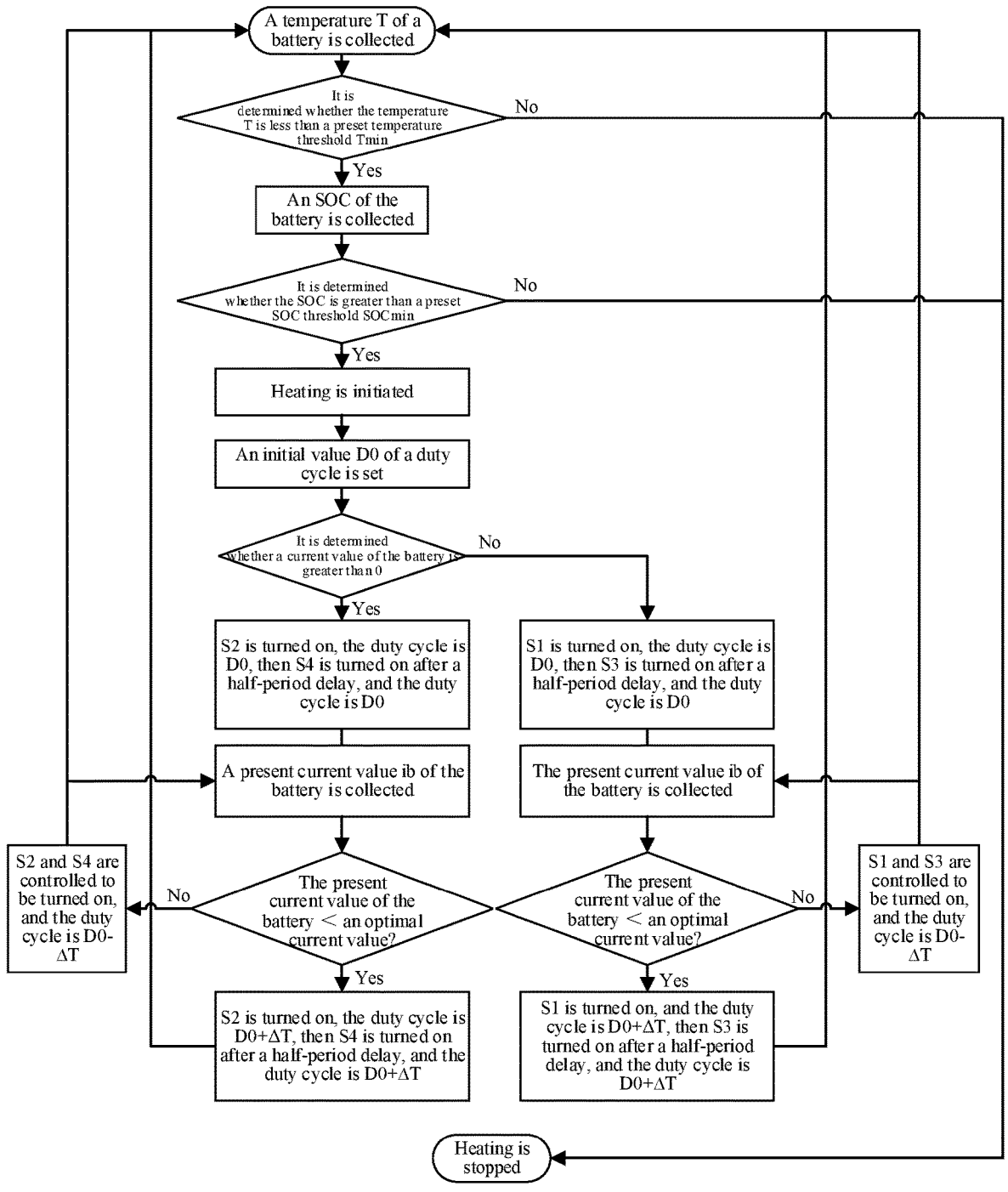
FIG. 8 is a flowchart of a battery energy processing method according to another exemplary embodiment.

FIG. 8 is a flowchart of a battery energy processing method according to an exemplary embodiment. As shown in FIG. 8, before self-heating of the battery, a battery management system may collect a battery temperature T. If the temperature T is less than a set temperature value Tmin, the battery SOC is collected. If it is determined that the collected SOC is greater than the set SOCmin, the heating is started. Alternatively, when the collected SOC is less than SOCmin, heating is not performed. The battery self-heating procedure can be started only when the sampled temperature T and the sampled SOC simultaneously satisfy the requirements, that is, T<Tmin and the sampled SOC is greater than SOCmin. For example, Tmin may be minus 10° C. and may be 10%. In addition, if the maximum temperature difference between cells is considered, the collected battery temperature may be an average value of multiple monitoring points.

When the battery self-heating procedure is started, a flow direction of a current may be determined first. If the battery charges the energy storage element, the current value is greater than 0, and S2 and S4 are controlled to control the battery to discharge. If the energy storage element charges the battery, the battery current value is less than 0, S1 and S3 are controlled to control the current to charge.

After the heating procedure is started, the initial duty cycle is set to DO in a case that the IGBT switching frequency of the voltage converter and the battery alternating carrier frequency are determined. If the current value is greater than 0, the battery charges the energy storage element at this time, and S2 is controlled to be turned on, and the duty cycle is D0. After a half-period delay, S4 is controlled to be turned on, and the duty cycle is DO. In addition, the current value on the circuit is collected at a same time. If the current value is less than the optimal current value, in the next carrier frequency period, S2 is turned on, and the duty cycle is D0+ΔT. After a half-period delay, S4 is turned on, and the duty cycle is D0+ΔT. If the current value is greater than the optimal current value, in the next carrier frequency period, S2 is controlled to be turned on, and the duty cycle is D0-ΔT. After a half-period delay, S4 is controlled to be turned on, and the duty cycle is D0-ΔT. After the duty cycle is adjusted, the battery temperature T needs to be collected again, and it is determined whether the battery temperature T reaches the set temperature value Tmin. If the battery current value is less than 0, the methods for controlling S1 and S3 are similar.

Figures 9, 10:
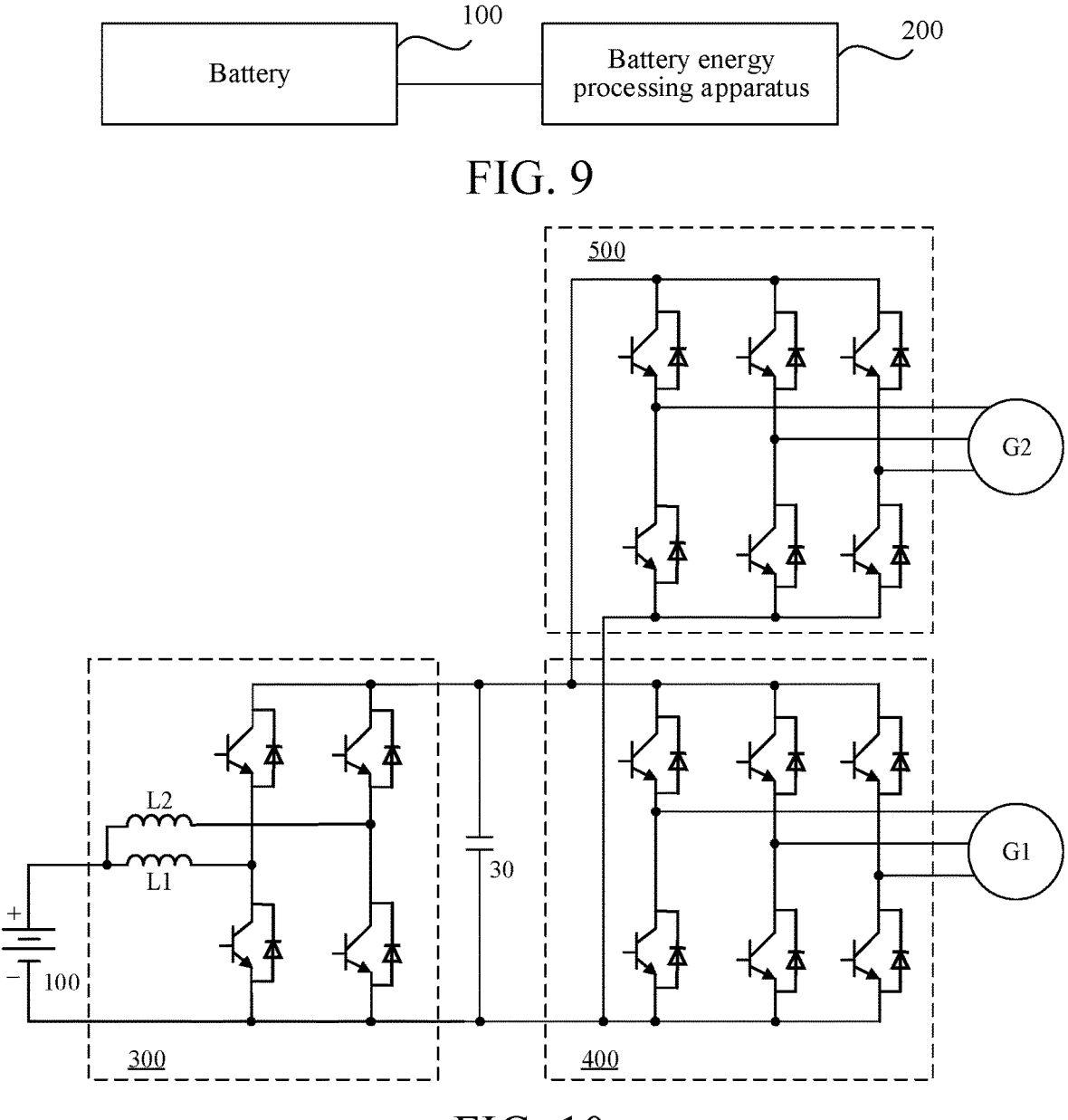
FIG. 9 is a structural block diagram of a vehicle according to an exemplary embodiment.
FIG. 10 is a structural block diagram of a vehicle according to another exemplary embodiment.

The present disclosure further provides a vehicle. FIG. 9 is a structural block diagram of a vehicle according to an exemplary embodiment. As shown in FIG. 9, the vehicle may include a battery 100 and the above battery energy processing device 200 provided in the present disclosure.

FIG. 10 is a structural block diagram of a vehicle according to another exemplary embodiment. In the embodiment, the vehicle is a hybrid vehicle. As shown in FIG. 10, the vehicle may include a battery 100, a voltage converter 300, a bus capacitor 30, a drive motor G1, a driving motor control bridge arm 400, a generator G2, and a generator control bridge arm 500. The above battery energy processing device 200 includes a voltage converter 300 and a bus capacitor 30. The voltage converter 300 includes a first inductor L1, a second inductor L2, and a two-phase bridge arm. A first confluent end of the two-phase bridge arm in the voltage converter 300 is also a first confluent end of the driving motor control bridge arm 400 and the generator control bridge arm 500, and a second confluent end of the two-phase bridge arm in the voltage converter 300 is also a second confluent end of the driving motor control bridge arm 400 and the generator control bridge arm 500.

The preferred implementations of the present disclosure are described in detail above with reference to the accompanying drawings, but the present disclosure is not limited to the specific details in the above implementations. Various simple variations may be made to the technical solutions of the present disclosure within the scope of the technical idea of the present disclosure, and such simple variations shall all fall within the protection scope of the present disclosure.

It should be additionally noted that, the specific technical features described in the foregoing specific implementations may be combined in any proper manner in a case without conflict. To avoid unnecessary repetition, various possible combination manners are not described in the present disclosure.

In addition, different implementations of the present disclosure may also be arbitrarily combined without departing from the idea of the present disclosure, and these combinations shall still be regarded as content disclosed in the present disclosure.

What is claimed is:

1. A battery energy processing device, comprising:
a first inductor, wherein a first end of the first inductor is connected with a positive electrode of a battery;
a second inductor, wherein a first end of the second inductor is connected with the positive electrode of the battery;
a first phase bridge arm, wherein a midpoint of the first phase bridge arm is connected with a second end of the first inductor;
a second phase bridge arm, wherein a midpoint of the second phase bridge arm is connected with a second end of the second inductor; a first end of the first phase bridge arm and a first end of the second phase bridge arm are connected together to form a first confluent end; a second end of the first phase bridge arm and a second end of the second phase bridge arm are connected together to form a second confluent end; and the second confluent end is connected with a negative electrode of the battery;
an energy storage element, wherein a first end of the energy storage element is connected with the first confluent end, and a second end of the energy storage element is connected with the second confluent end; and
a controller, configured to control the first phase bridge arm and the second phase bridge arm to charge and discharge the battery through the first inductor and the second inductor to heat the battery; and the first inductor and the second inductor are in different operating states.

2. The device according to claim 1, wherein the operating states comprise an energy storage state, a freewheeling state, and a non-operating state; and the controller is configured to control the first phase bridge arm and the second phase bridge arm to charge and discharge the battery and the energy storage element through the first inductor and the second inductor to heat the battery.

3. The device according to claim 2, wherein the controller is configured to control the first phase bridge arm and the second phase bridge arm to discharge the battery or the energy storage element to the first inductor to heat the battery; wherein the first inductor is in the energy storage state; and the second inductor is in the non-operating state.

4. The device according to claim 3, wherein the controller is configured to control the first phase bridge arm and the second phase bridge arm to discharge one of the battery and the energy storage element to the second inductor and charge the other of the battery and the energy storage element through the first inductor to heat the battery, wherein the second inductor is in the energy storage state; and the first inductor is in the freewheeling state.

5. The device according to claim 4, wherein the controller is configured to control the first phase bridge arm and the second phase bridge arm to charge the battery or the energy storage element through the second inductor to heat the battery, wherein the second inductor is in the freewheeling state; and the first inductor is in the non-operating state.

6. The device according to claim 1, wherein the battery is a vehicle-mounted battery; the first inductor and the second inductor are inductors in a voltage converter of a vehicle; the first phase bridge arm and the second phase bridge arm are bridge arms in the voltage converter; and the energy storage element is a bus capacitor.

7. The device according to claim 1, wherein the battery is a vehicle-mounted battery; the first phase bridge arm and the second phase bridge arm are bridge arms in a motor controller of the vehicle; and the energy storage element is the bus capacitor.

8. The device according to claim 7, further comprising:
a first switch module, wherein a first end of the first switch module is connected with the positive electrode of the battery; and a second end of the first switch module is connected with the first end of the energy storage element;
a second switch module, where a first end of the second switch module is connected with the midpoint of the first phase bridge arm; and a second end of the second switch module is connected with a first phase winding of a motor; and
a third switch module, wherein a first end of the third switch module is connected with the midpoint of the second phase bridge arm; a second end of the third switch module is connected with a second phase winding of the motor; and
the controller is configured to control the first switch module, the second switch module, and the third switch module to be turned off to heat the battery.

9. The device according to claim 8, further comprising a fourth switch module, wherein a first end of the fourth switch module is connected with the positive electrode of the battery; a second end of the fourth switch module is respectively connected with the first end of the first inductor and the first end of the second inductor;

the controller is further configured to control the fourth switch module to be turned off, and control the first switch module, the second switch module, and the third switch module to be turned on, so as to realize driving of the motor by the battery.

10. The device according to claim 2, wherein the controller is configured to control the first phase bridge arm and the second phase bridge arm to cyclically charge and discharge the battery and the energy storage element through the first inductor and the second inductor to heat the battery, wherein the first inductor and the second inductor are in different operating states.

11. A battery energy processing method, comprising:

it being determined that a battery is required to be heated;

controlling a first phase bridge arm and a second phase bridge arm to charge and discharge the battery through a first inductor and a second inductor to heat the battery, wherein the first inductor and the second inductor are in different operating states, wherein a first end of the first inductor is connected with a positive electrode of the battery; a first end of the second inductor is connected with the positive electrode of the battery; a midpoint of the first phase bridge arm is connected with a second end of the first inductor; a midpoint of the second phase bridge arm is connected with a second end of the second inductor; a first end of the first phase bridge arm and a first end of the second phase bridge arm are connected together to form a first confluent end; a second end of the first phase bridge arm and a second end of the second phase bridge arm are connected together to form a second confluent end; the second confluent end is connected with a negative electrode of the battery; a first end of an energy storage element is connected with the first confluent end; and a second end of the energy storage element is connected with the second confluent end.

12. The method according to claim 11, wherein the operating states comprise an energy storage state, a freewheeling state, and a non-operating state;

the step of controlling a first phase bridge arm and a second phase bridge arm to charge and discharge the battery through a first inductor and a second inductor to heat the battery comprises: controlling the first phase bridge arm and the second phase bridge arm to charge and discharge the battery and the energy storage element through the first inductor and the second inductor to heat the battery.

13. The method according to claim 12, wherein the step of controlling the first phase bridge arm and the second phase bridge arm to charge and discharge the battery and the energy storage element through the first inductor and the second inductor to heat the battery comprises:

controlling the first phase bridge arm and the second phase bridge arm to discharge the battery or the energy storage element to the first inductor to heat the battery, wherein the first inductor is in the energy storage state; and the second inductor is in the non-operating state; or controlling the first phase bridge arm and the second phase bridge arm to discharge one of the battery and the energy storage element to the second inductor and charge the other of the battery and the energy storage element through the first inductor to heat the battery, wherein the second inductor is in the energy storage state; and the first inductor is in the freewheeling state; or controlling the first phase bridge arm and the second phase bridge arm to charge the battery or the energy storage element through the second inductor to heat the battery, wherein the second inductor is in the freewheeling state; and the first inductor is in the non-operating state.

14. The method according to claim 11, wherein the step of controlling the first phase bridge arm and the second phase bridge arm to charge and discharge the battery and the energy storage element through the first inductor and the second inductor comprises:

controlling a lower bridge arm of the first phase bridge arm to be turned on, and controlling an upper bridge arm of the first phase bridge arm and an upper bridge arm and a lower bridge arm of the second phase bridge arm to be turned off, to cause the battery to charge the first inductor;

controlling the upper bridge arm of the first phase bridge arm and the lower bridge arm of the second phase bridge arm to be turned on, and controlling the lower bridge arm of the first phase bridge arm and the upper bridge arm of the second phase bridge arm to be turned off, to cause the battery to charge the second inductor and cause the first inductor to charge the energy storage element;

controlling the upper bridge arm of the second phase bridge arm to be turned on, and controlling the lower bridge arm of the second phase bridge arm and the upper bridge arm and the lower bridge arm of the first phase bridge arm to be turned off, to cause the second inductor to charge the energy storage element;

controlling the upper bridge arm of the second phase bridge arm to be turned on, and controlling the lower bridge arm of the second phase bridge arm and the upper bridge arm and the lower bridge arm of the first phase bridge arm to be turned off, to cause the energy storage element to charge the battery through the second inductor;

controlling the upper bridge arm of the first phase bridge arm and the lower bridge arm of the second phase bridge arm to be turned on, and controlling the lower bridge arm of the first phase bridge arm and the upper bridge arm of the second phase bridge arm to be turned off, to cause the energy storage element to charge the battery through the first inductor and cause the second inductor to charge the battery; and controlling the lower bridge arm of the first phase bridge arm to be turned on, and controlling the upper bridge arm of the first phase bridge arm and the upper bridge arm and the lower bridge arm of the second phase bridge arm to be turned off, to cause the first inductor to charge the battery.

15. The method according to claim 11, wherein the step of controlling the first phase bridge arm and the second phase bridge arm to charge and discharge the battery and the energy storage element through the first inductor and the second inductor comprises:

controlling a lower bridge arm of the first phase bridge arm to be turned on, and controlling an upper bridge arm of the first phase bridge arm and an upper bridge arm and a lower bridge arm of the second phase bridge arm to be turned off, to cause the battery to charge the first inductor;

controlling the upper bridge arm of the first phase bridge arm and the lower bridge arm of the second phase bridge arm to be turned on, and controlling the lower bridge arm of the first phase bridge arm and the upper bridge arm of the second phase bridge arm to be turned off, to cause the battery to charge the second inductor and cause the first inductor to charge the energy storage element;

controlling the upper bridge arm of the second phase bridge arm to be turned on, and controlling the lower bridge arm of the second phase bridge arm and the upper bridge arm and the lower bridge arm of the first phase bridge arm to be turned off, to cause the second inductor to charge the energy storage element;

controlling the upper bridge arm of the first phase bridge arm to be turned on, and controlling the lower bridge arm of the first phase bridge arm and the upper bridge arm and the lower bridge arm of the second phase bridge arm to be turned off, to cause the energy storage element to charge the battery through the first inductor;

controlling the lower bridge arm of the first phase bridge arm and the upper bridge arm of the second phase bridge arm to be turned on, and controlling the upper bridge arm of the first phase bridge arm and the lower bridge arm of the second phase bridge arm to be turned off, to cause the energy storage element to charge the battery through the second inductor and cause the first inductor to charge the battery; and controlling the lower bridge arm of the second phase bridge arm to be turned on, and controlling the upper bridge arm of the second phase bridge arm and the upper bridge arm and the lower bridge arm of the first phase bridge arm to be turned off, to cause the second inductor to charge the battery.

16. The method according to claim 12, wherein in a stage in which one of the first inductor and the second inductor is in the energy storage state and the other is in the freewheeling state, after a bridge arm configured to perform freewheeling of the inductor is controlled to operate, a bridge arm configured to perform energy storage of the inductor is controlled to operate after a delay of a preset duration.

17. The method according to claim 11, wherein a switching frequency or a duty cycle of the first phase bridge arm and the second phase bridge arm is adjusted during the heating to cause a value of a current flowing through the battery to reach an optimal current value.

18. The method according to claim 17, wherein the step of adjusting a duty cycle of the first phase bridge arm and the second phase bridge arm during the heating to cause a value of a current flowing through the battery to reach an optimal current value comprises:

adjusting a duty cycle of the first phase bridge arm and the second phase bridge arm in a next carrier frequency period during the heating according to a comparison result of the value of the current flowing through the battery and the optimal current value and the duty cycle of the first phase bridge arm and the second phase bridge arm in a present carrier frequency period, to cause the value of the current flowing through the battery to reach the optimal current value.

19. The method according to claim 18, wherein the adjusting the duty cycle of the first phase bridge arm and the second phase bridge arm in a next carrier frequency period during the heating according to a comparison result of the value of the current flowing through the battery and the optimal current value and the duty cycle of the first phase bridge arm and the second phase bridge arm in a present carrier frequency period, to cause the value of the current flowing through the battery to reach the optimal current value comprises:

during charging or discharging of the battery, controlling the first phase bridge arm and the second phase bridge arm to cause the duty cycle of the first phase bridge arm and the second phase bridge arm in the next carrier frequency period to be greater than the duty cycle in the present carrier frequency period if the value of the current flowing through the battery is less than the optimal current value; and controlling the first phase bridge arm and the second phase bridge arm to cause the duty cycle of the first phase bridge arm and the second phase bridge arm in the next carrier frequency period to be less than the duty cycle in the present carrier frequency period if the value of the current flowing through the battery is greater than the optimal current value, until the value of the current flowing through the battery reaches the optimal current value.

20. A vehicle, comprising a battery and the battery energy processing device according to claim 1.

* * * * *